US008655820B2

(12) United States Patent
Fein et al.

(10) Patent No.: US 8,655,820 B2
(45) Date of Patent: Feb. 18, 2014

(54) REAL-TIME LIFESTYLE RECOMMENDATION SYSTEM

(75) Inventors: Gene Fein, Malibu, CA (US); Edward Merritt, Lenox, MA (US)

(73) Assignee: Empire Technology Development LLC, Wilmington, DE (US)

( * ) Notice: Subject to any disclaimer, the term of this patent is extended or adjusted under 35 U.S.C. 154(b) by 733 days.

(21) Appl. No.: 12/200,043

(22) Filed: Aug. 28, 2008

(65) Prior Publication Data

US 2010/0057658 A1    Mar. 4, 2010

(51) Int. Cl.
*G06F 19/00* (2011.01)
(52) U.S. Cl.
USPC .......................................................... 706/46
(58) Field of Classification Search
USPC ................................. 706/46; 705/14; 710/18
See application file for complete search history.

(56) References Cited

U.S. PATENT DOCUMENTS

| 6,611,881 B1 * | 8/2003 | Gottfurcht et al. ............... 710/18 |
| 2006/0015404 A1 * | 1/2006 | Tran ................................ 705/14 |

FOREIGN PATENT DOCUMENTS

| JP | 2001-331725 | 11/2001 |
| JP | 2002-041776 | 2/2002 |
| JP | 2002-108924 | 4/2002 |
| JP | 2003-157391 | 5/2003 |
| JP | 2004-078467 | 3/2004 |
| JP | 2004-252494 | 9/2004 |
| JP | 2005-037757 | 2/2005 |
| JP | 2006-018755 | 1/2006 |
| JP | 2006-350746 | 12/2006 |

OTHER PUBLICATIONS

Nijholt, A., "Capturing Immediate Interests in Ambient Intelligent Environments," IADIS International Conference Intelligent Systems and Agents 2007, Lisbon, Portugal, Jul. 3-5, 2007 8 pages.*
From Wikipedia, "Cloud computing," printed Jun. 25, 2008; http://en.wikipedia.org/wiki/Could_computing.
Summary of Office Action for JP-2008-291641, mailed on Jan. 13, 2012, 9 pp.

* cited by examiner

*Primary Examiner* — Jeffrey A Gaffin
*Assistant Examiner* — Ola Olude Afolabi
(74) *Attorney, Agent, or Firm* — Foley & Lardner LLP

(57) ABSTRACT

A method of providing a recommendation is provided. The method includes receiving user provided information at a first device from a second device. The user provided information includes user preference information and a user account authorization. User account information is requested from the first device based on the user account authorization. The requested user account information is received from a third device at the first device. The received user provided information and the received user account information is stored at a device accessible by the first device. A request for a recommendation is received from the second device. The recommendation is determined based on the stored user provided information and the stored user account information. The determined recommendation is sent from the first device to the second device.

20 Claims, 7 Drawing Sheets

REAL-TIME LIFESTYLE RECOMMENDATION SYSTEM

BACKGROUND

Lifestyle recommendation systems exist to make recommendations in a variety of areas including music, personal introductions, movies, real estate, insurance, restaurants, etc. Some systems can synthesize preferences into a choreographed setting of preferences, such as those within a home that regulate temperature, climate, media, lighting, security settings, etc., based upon parameters defined by the users. Currently, the use of customized systems function based on a request by the user answered by a receipt of information from the recommendation system. In some systems, an issue may be detected that the system is programmed to respond to such as a sensor detecting an accident and reporting the accident to a service.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
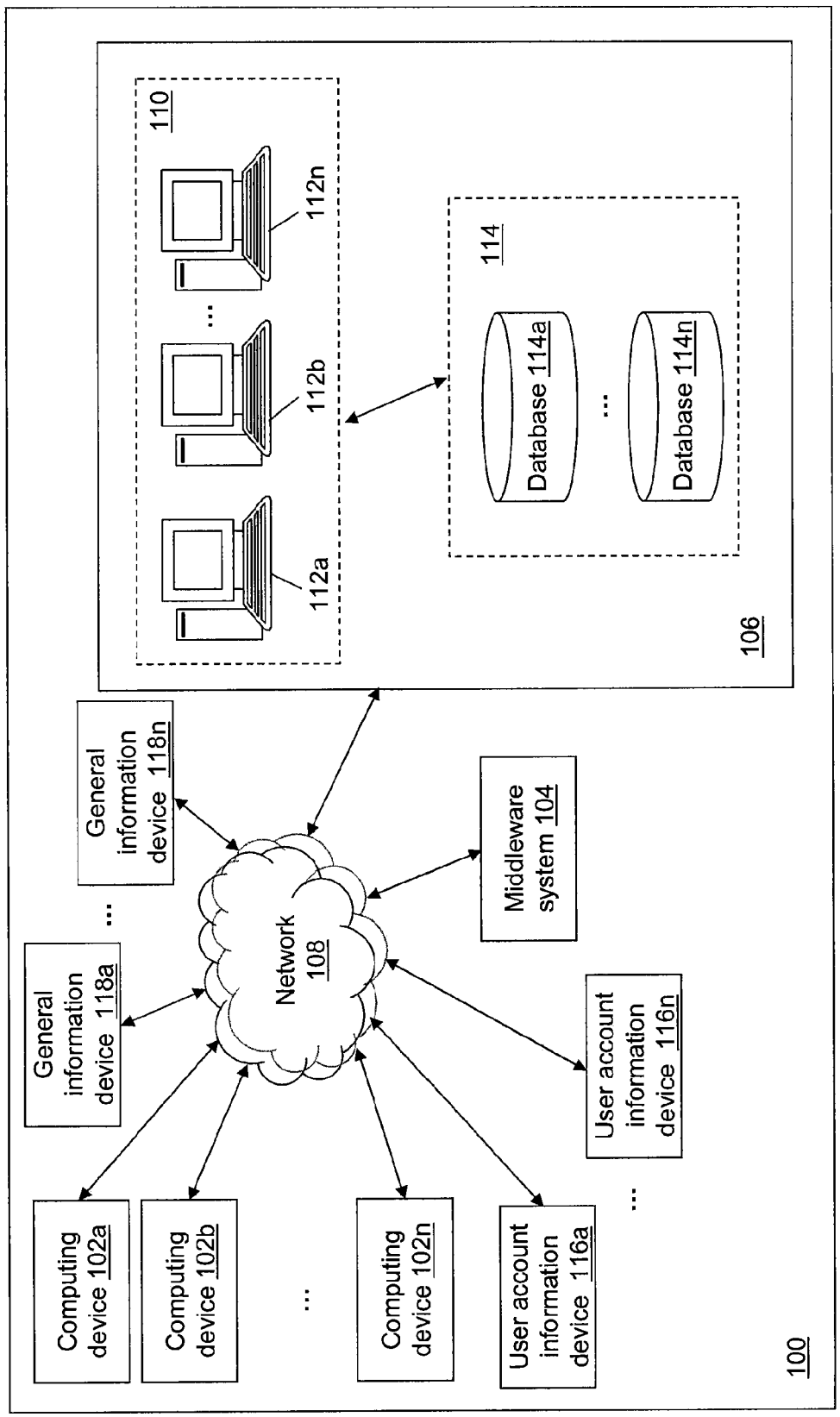
FIG. 1 depicts a block diagram of a lifestyle recommendation system in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Illustrative systems, methods, devices, etc. are described for lifestyle recommendation systems using user provided information, user information accessible by the lifestyle recommendation system, general information that may impact lifestyle recommendations, and current user location information. With reference to FIG. 1, a block diagram of a lifestyle recommendation system 100 is shown in accordance with an illustrative embodiment. Lifestyle recommendation system 100 can include one or more user computing devices 102a, 102b, ..., 102n, a middleware system 104, a cloud computing system 106, one or more user account information devices 116a, ..., 116n, and one or more general information devices 118a, ..., 118n. The one or more user computing devices 102a, 102b, ..., 102n may be a computer of any form factor including a laptop, a desktop, a server, an integrated messaging device, a personal digital assistant, a cellular telephone, an iPod™, etc. The one or more user computing devices 102a, 102b, ..., 102n may be associated with the same and/or different users. The one or more user account information devices 116a, ..., 116n and the one or more general information devices 118a, ... 118n may be computers of any form factor. The devices associated with the one or more user computing devices 102a, 102b, ..., 102n, middleware system 104, cloud computing system 106, the one or more user account information devices 116a, ..., 116n, and the one or more general information devices 118a, ..., 118n may communicate using a network 108. Network 108 may include one or more type of network including a cellular network, a peer-to-peer network, the Internet, a local area network, a wide area network, a Wi-Fi network, a Bluetooth™ network, etc.

Cloud computing system 106 can include one or more servers 110 and one or more databases 114. A cloud computing system refers to one or more computational resources accessible over a network to provide users with on-demand computing services. The one or more servers 110 can include one or more computing devices 112a, 112b, ..., 112n which may be computers of any form factor. The one or more databases 114 can include a first database 114a, ..., and an nth database 114n. The one or more databases 114 can be housed on one or more of the one or more servers 110 or may be housed on separate computing devices accessible by the one or more servers 110 directly through wired or wireless connection or through network 108. The one or more databases 114 may be organized into tiers and may be developed using a variety of database technologies without limitation. The components of cloud computing system 106 may be implemented in a single computing device or a plurality of computing devices in a single location, in a single facility, and/or may be remote from one another.

Figure 2:
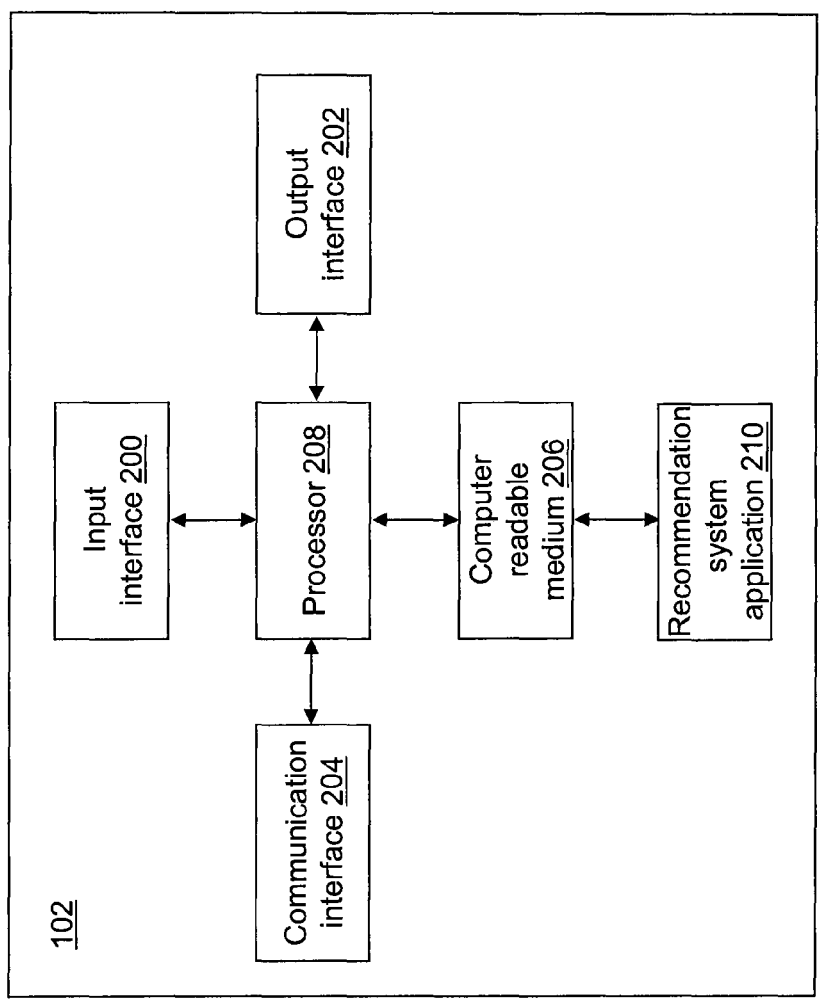
FIG. 2 depicts a block diagram of a user computing device of the lifestyle recommendation system of FIG. 1 in accordance with an illustrative embodiment.

With reference to FIG. 2, a block diagram of a user computing device 102 of lifestyle recommendation system 100 is shown in accordance with an illustrative embodiment. User computing device 102 can include an input interface 200, an output interface 202, a communication interface 204, a computer-readable medium 206, a processor 208, and a recommendation system application 210. Different and additional components may be incorporated into user computing device 102 without limitation. Recommendation system application 210 provides a graphical user interface with user selectable and controllable functionality. Recommendation system application 210 may include a browser application and/or other user interface based application that interacts with middleware system 104 to automatically, or under control of the user, submit a request for a lifestyle recommendation such as a recommendation for a restaurant.

Input interface 200 provides an interface for receiving information from the user for entry into user computing device 102 as known to those skilled in the art. Input interface 200 may interface with various input technologies including, but not limited to, a keyboard, a pen and touch screen, a mouse, a track ball, a touch screen, a keypad, one or more buttons, etc. to allow the user to enter information into user computing device 102 or to make selections presented in a user interface displayed using a display under control of recommendation system application 210. Input interface 104 may provide both an input and an output interface. For example, a touch screen both allows user input and presents output to the user. User computing device 102 may have one or more input interfaces that use the same or a different interface technology.

Output interface 202 provides an interface for outputting information for review by a user of user computing device 102. For example, output interface 202 may include an interface to a display, a printer, a speaker, etc. The display may be any of a variety of displays including, but not limited to, a thin film transistor display, a light emitting diode display, a liquid crystal display, etc. The printer may be any of a variety of printers including, but not limited to, an ink jet printer, a laser printer, etc. User computing device 102 may have one or more output interfaces that use the same or a different interface technology.

Communication interface 204 provides an interface for receiving and transmitting data between devices using various protocols, transmission technologies, and media. The communication interface may support communication using various transmission media that may be wired or wireless. User computing device 102 may have one or more communication interfaces that use the same or different protocols, transmission technologies, and media.

Computer-readable medium 206 is an electronic holding place or storage for information so that the information can be accessed by processor 208. Computer-readable medium 206 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, etc. User computing device 102 may have one or more computer-readable media that use the same or a different memory media technology. User computing device 102 also may have one or more drives that support the loading of a memory media such as a CD, a DVD, a flash memory card, etc.

Processor 208 executes instructions as known to those skilled in the art. The instructions may be carried out by a special purpose computer, logic circuits, or hardware circuits. Thus, processor 208 may be implemented in hardware, firmware, software, or any combination of these methods. The term "execution" is the process of running an application or the carrying out of the operation called for by an instruction. The instructions may be written using one or more programming language, scripting language, assembly language, etc. Processor 208 executes an instruction, meaning that it performs the operations called for by that instruction. Processor 208 operably couples with input interface 200, with output interface 202, with communication interface 204, with computer-readable medium 206, and with recommendation system application 210 to receive, to send, and to process information. Processor 208 may retrieve a set of instructions from a permanent memory device and copy the instructions in an executable form to a temporary memory device that is generally some form of RAM. User computing device 102 may include a plurality of processors that use the same or a different processing technology.

Figure 3:
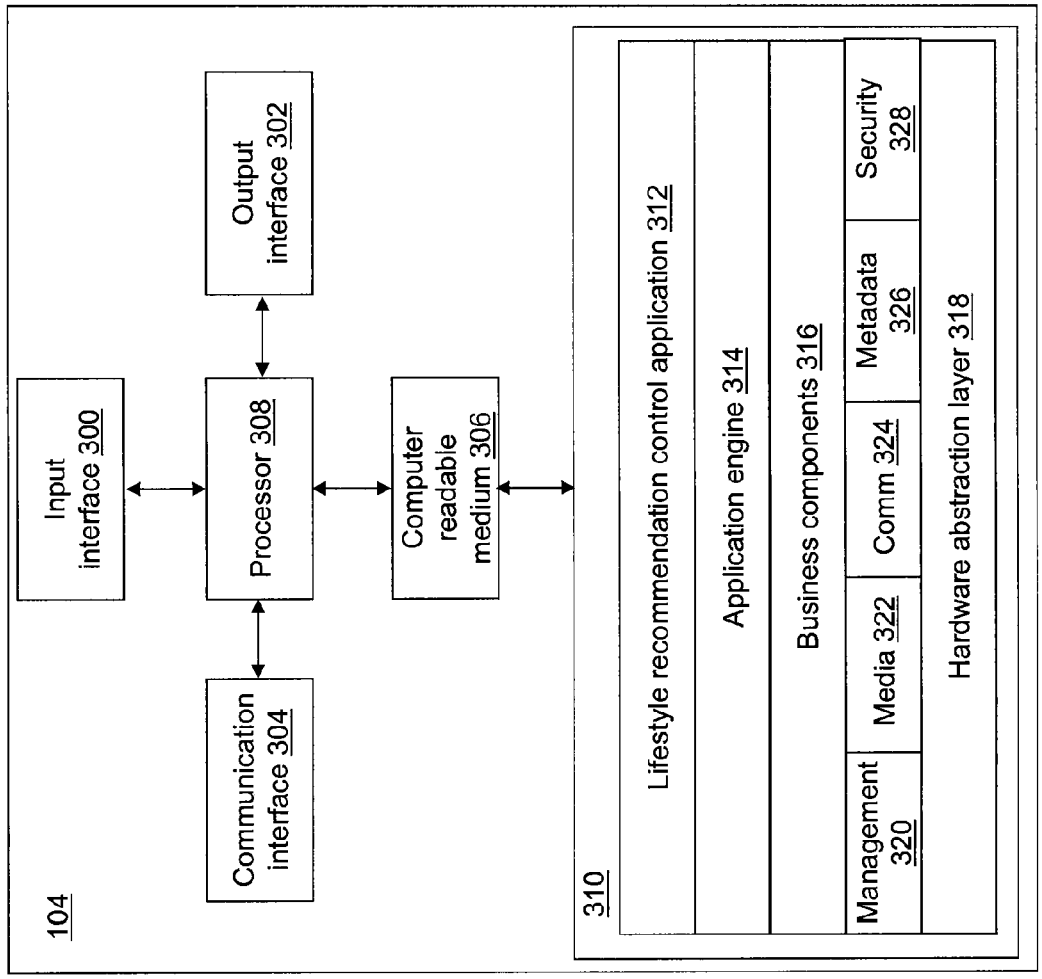
FIG. 3 depicts a block diagram of a middleware system of the lifestyle recommendation system of FIG. 1 in accordance with an illustrative embodiment.

With reference to FIG. 3, a block diagram of middleware system 104 of lifestyle recommendation system 100 is shown in accordance with an illustrative embodiment. Middleware system 104 can include an input interface 300, an output interface 302, a communication interface 304, a computer-readable medium 306, a processor 308, and a lifestyle recommendation architecture 310. Different and additional components may be incorporated into middleware system 104 without limitation. For example, middleware system 104 may include a database that is directly accessible by middleware system 104 or accessible by middleware system 104 using a network such as network 108. Middleware system 104 may further include a cache for temporarily storing information communicated to middleware system 104. Input interface 300 provides similar functionality to input interface 200. Output interface 302 provides similar functionality to output interface 202. Communication interface 304 provides similar functionality to communication interface 204. Computer-readable medium 306 provides similar functionality to computer-readable medium 206. Processor 308 provides similar functionality to processor 208.

Lifestyle recommendation architecture 310 can include a lifestyle recommendation control application 312, an application engine 314, business components 316, and a hardware abstraction layer 318. Lifestyle recommendation control application 312 includes the operations associated with interfacing between cloud computing system 106 and user computing device 102 to maintain and organize user information and to process a request for a lifestyle recommendation. Lifestyle recommendation architecture 310 includes functionality to support delivery of the latest recommendations, which can also be set or adjusted to include recommendations for the future, a list of past recommendations and results in terms of user happiness, with previous recommendations that the user has utilized.

Lifestyle recommendation architecture 310 may utilize load balancing servers, content servers, database servers, application servers, and registration servers. The application and registration servers facilitate the registration process for a user as well as the download of recommendation system application 210 and application updates. Middleware system 104 is configured to download the correct software application for the one or more user computing devices 102a, 102b, . . . , 102n based upon registration information received from the user. During the registration process the user may fill in certain fields that assist in the identification of the user's lifestyle choices and preferences. User related data is received from the one or more user computing devices 102a, 102b, . . . , 102n and formatted using the application and database servers. The load balancing servers sort user queries from data sent from the user and sort external data sources emanating from a user's access and applicability to lifestyle recommendation system 100. Middleware system 104 sends anonymous data points to cloud computing system 106 that constitute a user's current settings and information along with any new data and security specifications of cloud computing system 106.

Figure 4:
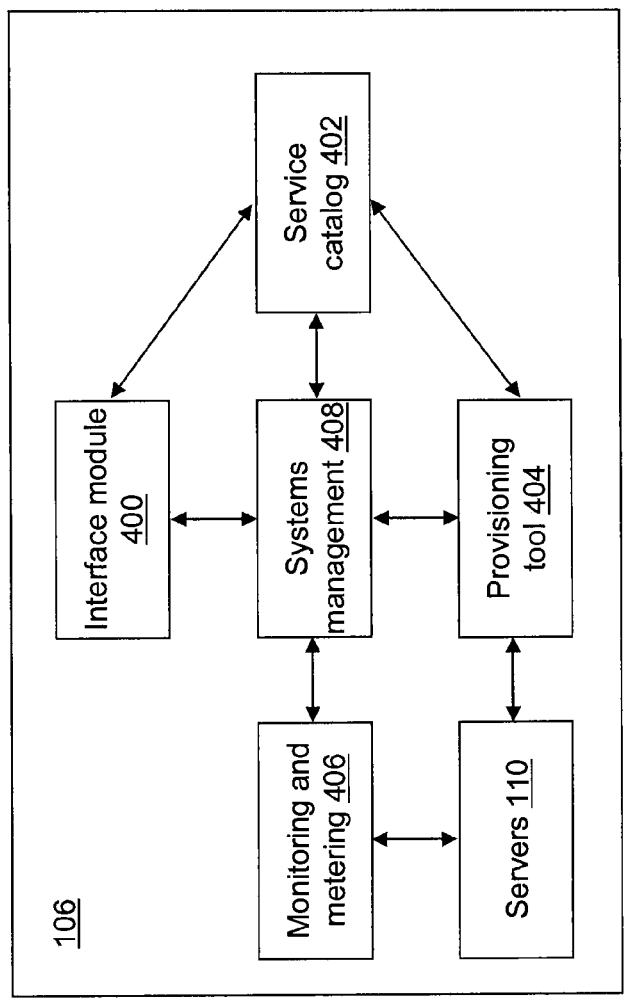
FIG. 4 depicts a block diagram of a cloud computing system of the lifestyle recommendation system of FIG. 1 in accordance with an illustrative embodiment.

With reference to FIG. 4, a block diagram of modules associated with cloud computing system 106 of lifestyle recommendation system 100 is shown in accordance with an illustrative embodiment. Cloud computing system 106 can include an interface module 400, a service catalog 402, a provisioning tool 404, a monitoring and metering module 406, a system management module 408, and the one or more servers 110. Different and additional components may be incorporated into cloud computing system 106 without limitation. For example, cloud computing system 106 may further include the one or more databases 114. Middleware system 104 interacts with interface module 400 to request services. Service catalog 402 provides a list of services that middleware system 104 can request. Provisioning tool 404 allocates computational resources from the one or more servers 110 to deliver the requested service and may deploy the required images for execution at the one or more servers 110. Monitoring and metering module 406 tracks the usage of the one or more servers 110 so the resources used can be attributed to a certain user possibly for billing purposes. System management module 408 manages the one or more servers 110. The one or more servers 110 can be interconnected as if in a grid running in parallel.

Interface module 400 may be configured to allow selection of a service from service catalog 402. A request associated with a selected service may be sent to system management module 408. System management module 408 identifies an available resource(s) such as one or more of servers 110 and/or one or more of databases 114. System management module 408 calls provisioning tool 404 to allocate the identified resource(s). Provisioning tool 404 may deploy a requested stack or web application as well.

Figure 5:
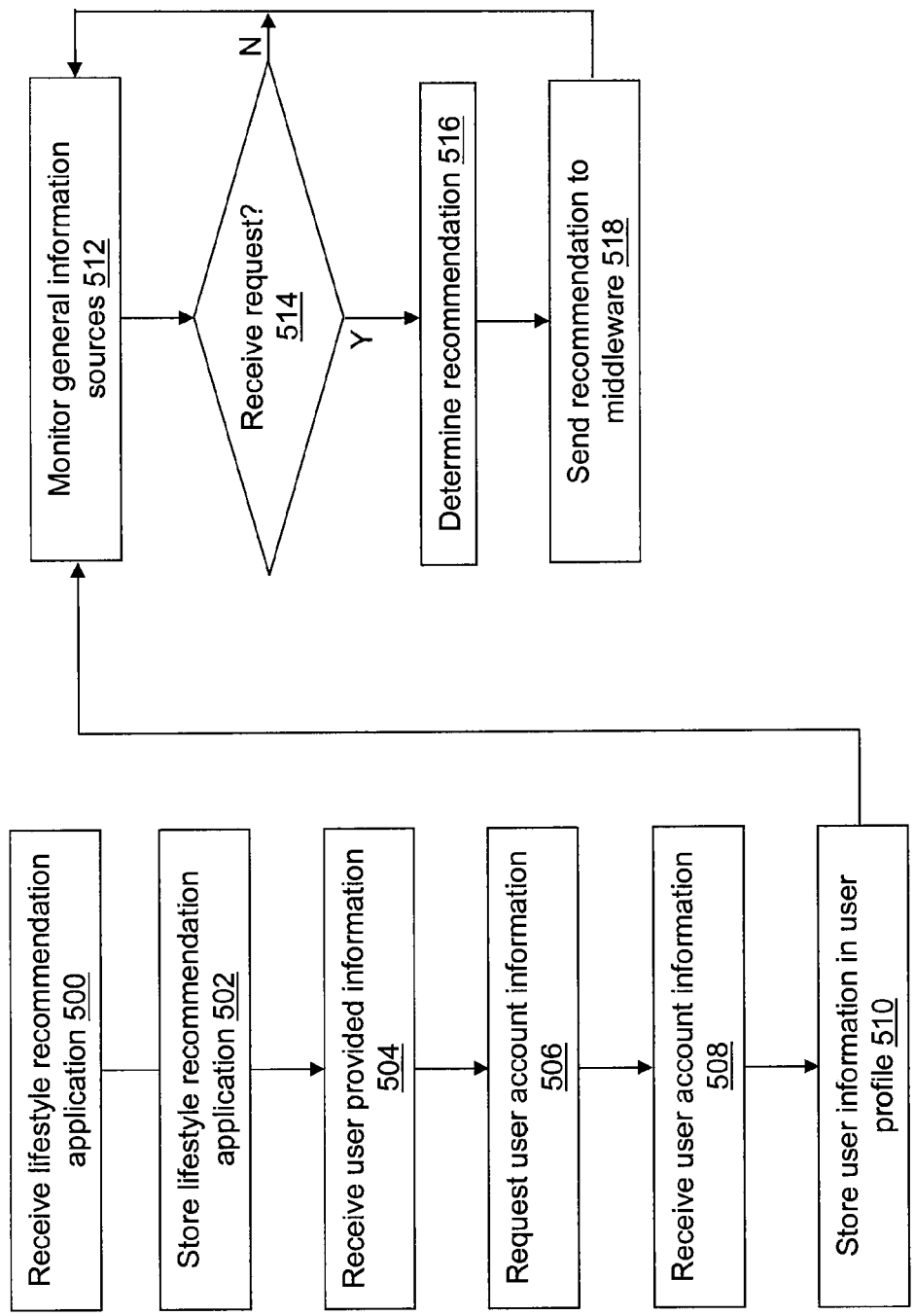
FIG. 5 depicts a flow diagram illustrating operations performed by the cloud computing system of FIG. 4 in accordance with an Illustrative embodiment.

With reference to FIG. 5, illustrative operations performed by cloud computing system 106 are described. Additional, fewer, or different operations may be performed, depending on the embodiment. The order of presentation of the operations of FIG. 5 is not intended to be limiting. In an operation 500, one or more lifestyle recommendation applications are received. For example, the one or more lifestyle recommendation applications may include a relational database and stored procedure functions with superkeys, compound keys, and unique keys to sort through various data buckets/parameters that are updated frequently through middleware system 104. The one or more lifestyle recommendation applications may be in a text format, an object code format, or an executable format. The received one or more lifestyle recommendation applications are stored to cloud computing system 106 in an operation 502. User provided information is received in an operation 504. For example, user provided information may include home and work/vocation address, age, sex, race, sexual orientation, daily, weekly, monthly and yearly income, investment planning and implementation, entertainment and media preferences, daily/weekly/monthly/yearly schedule, spending habits, vacation preferences, restaurant preferences, health/medical and exercise regimen and history, social habits, political affiliations, hobbies, home/home maintenance information, children's needs, family and friends dossier including birthdays and likes and dislikes, personality profile, etc.

In an operation 506, user account information is requested given that the user has granted access to user account information to do so was received as part of the user provided information. In an operation 508, the user account information is received. For example, user account information may include any expressly authorized data that can be accessed by the one or more lifestyle recommendation applications of cloud computing system 106 from the one or more user account information devices 116a, . . . , 116n. Thus, user account information can include information obtained from the user's files and directories on one or more of the user's computing device(s), online accounts obtained from the one or more user account information devices 116a, . . . , 116n, information obtained from other third party networked computers of family, affiliations, or friends that may relate to the user with the permission of the third parties, etc. Access to these systems can allow the one or more lifestyle recommendation applications of cloud computing system 106 to gather and synthesize information relating to the user's contacts, including personal, business, and vendor contacts. Items such as media collections, (positioning system (GPS) information, investment holdings, bank statements and credit card accounts can also be utilized. In an operation 510, the user information including the user provided information and the user account information is stored in cloud computing system 106.

In an operation 512, general information that can be accessed by the one or more lifestyle recommendation applications of cloud computing system 106 from the one or more general information devices 118a, . . . , 118n is monitored to provide additional input into the lifestyle recommendation process. The general information can include information from news services, weather and traffic patterns, health information, travel information, dining and entertainment guides, dating services, professional services, time of day information, and other researchable areas that may provide general reference data to assist in determining a recommendation for the user and are accessible by the one or more lifestyle recommendation applications of cloud computing system 106 from the one or more general information devices 118a, . . . , 118n.

If a request is not received in an operation 514, processing continues at operation 512 to continuously monitor the one or more general information devices 118a, . . . , 118n for general information that may assist in determining a recommendation for the user in the future. If a request is received in operation 514, processing continues at operation 516.

In operation 516, a lifestyle recommendation is determined based on information received in the request, on the general information of relevance to the user, and on the stored user information. For example, the request may indicate an exit the user's vehicle is approaching, the vehicle functional status, the date and time of day, and the user information may include the user's eating preferences, and when the user last ate based on both the user's eating habits and an up to date scan of the user's debit/credit card information. The most time sensitive information may be processed first, and the information delivered to the user's computing device(s) most likely to be accessible to middleware system 104 based upon the information available. For example, cloud computing system 106 may receive information from middleware system 104 that the user is approaching, an intersection at 5:15 pm on a Friday evening. The received information does not include an indication of a mechanical issue with the vehicle, so cloud computing system 106 does not prioritize that information to recommend that the user pull over to a gas station at a nearby intersection. Instead, cloud computing system 106 associates the time of day with the user's habits to determine that the user frequently eats at a first nearby restaurant with a greater frequency than a second nearby restaurant. Based on the frequency of eating at the first nearby restaurant, cloud computing system 106 may send a recommendation to the user to see if a call should be placed to reserve a table for the user at the first nearby restaurant. The request may include an indication that the user is in their car. As a result, cloud computing system 106 contacts the user's cell phone via middleware system 104. Middleware system 104 configures the user interface, operating system, and media to conform to the needs of the user's device.

As another example, cloud computing system 106 may prompt the user that it is his wife's birthday tomorrow if no purchase for her is indicated on his debit/credit card statement. As a result, cloud computing system 106 may recommend that the user stop at his wife's favorite spa and pick up a gift certificate for treatments that his wife prefers and beauty products that are known to be available from a scan or system call to confirm the store's inventory.

In an operation 518, the determined recommendation is sent to middleware system 104 and processing continues at operation 512 to continuously monitor the one or more general information devices 118a, . . . , 118n for general information that may assist in determining a recommendation for the user in the future.

Figure 6:
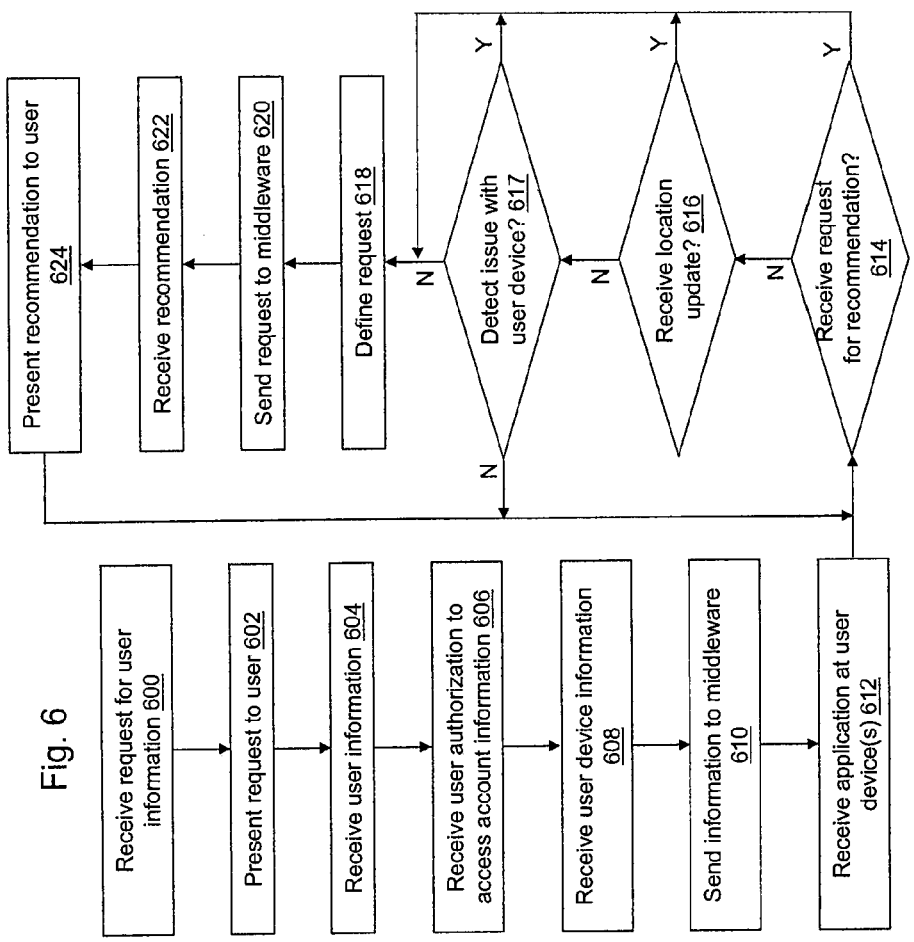
FIG. 6 depicts a flow diagram illustrating operations performed by the user computing device of FIG. 2 in accordance with an Illustrative embodiment.

With reference to FIG. 6, illustrative operations performed by user computing device 102 are described. Additional, fewer, or different operations may be performed, depending on the embodiment. The order of presentation of the operations of FIG. 6 is not intended to be limiting. In an operation 600, a first request for a user to enter information is received. For example, the user may access a website using a browser application which causes the first request to be received at user computing device 102. In an operation 602, the request for information is presented to the user. For example, the user may be presented with a series of questions to identify the user's preferences, habits, likes, dislikes, etc. In an operation 604, the user information is received. In an operation 606, user authorization information to access one or more user account information devices 116a, . . . , 116n including the user's computing device(s) is received. In an operation 608, user device information is received which may include the type of device, the operating system, the hardware characteristics of the device, etc. In an operation 610, the received user information, the received user authorization information, and the received user device information is sent to middleware system 104 in one or more messages. In an operation 612, the recommendation system application 210 is received and installed, if necessary, at the one or more user computing device(s) identified by the user device information.

After being received and installed, if necessary, the one or more user computing device(s) execute recommendation system application 210. If a request for a recommendation is received from the user in an operation 614, processing continues at an operation 618. If a request for a recommendation is not received in operation 614, processing continues at an operation 616. If a user location update is not received in operation 616, processing continues at operation 617. If a user location update is received in operation 616, processing continues at operation 618. For example, a user may enter a location update or a GPS may be associated with user computing device 102 such that an update is automatically sent, for example, periodically or after a defined travel distance, etc. If an issue with a user device associated with user computing device 102 is received from the user in operation 617, processing continues at operation 618. If an issue with the user device associated with user computing device 102 is not received in operation 617, processing continues at operation 614 to continuously monitor for a request for a recommendation and/or for a user location update and/or for an issue with the user device.

In operation 618, a request is defined based on the operation that led to defining the request. In an operation 620, the defined request is sent to middleware system 104. In an operation 622, a recommendation is received from middleware system 104. In an operation 624, the recommendation is presented at user computing device 102. For example, a map may be displayed to the user indicating a restaurant or gas station location using output interface 202, a recommendation may be presented to the user using output interface 202, etc.

Figure 7:
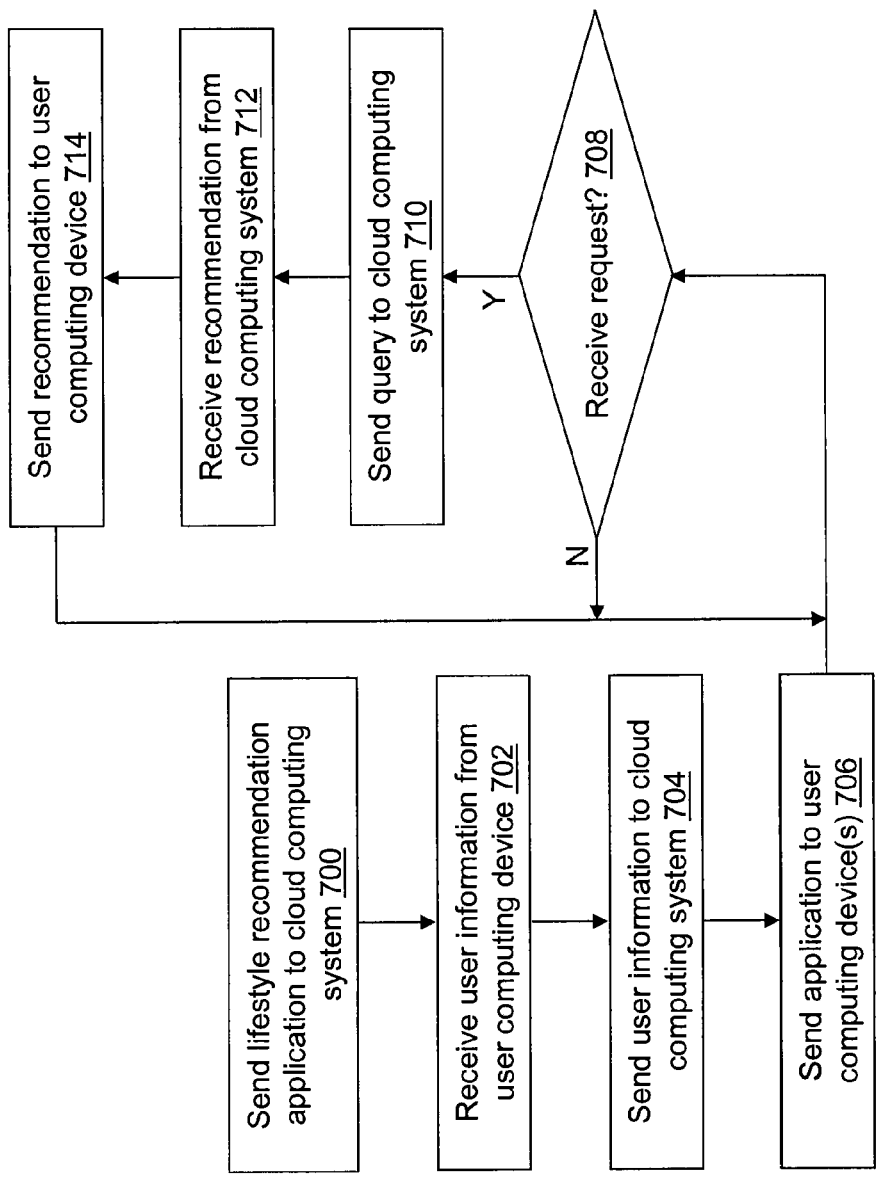
FIG. 7 depicts a flow diagram illustrating operations performed by the middleware system of FIG. 3 in accordance with an Illustrative embodiment.

With reference to FIG. 7, illustrative operations performed by middleware system 104 are described. Additional, fewer, or different operations may be performed, depending on the embodiment. The order of presentation of the operations of FIG. 7 is not intended to be limiting. Middleware system 104 defines the parameters for returning readable data to computing device 102 using application programming interfaces, for example associated with operating system compatibility, display capability, media player capability, etc. In an operation 700, the one or more lifestyle recommendation applications are sent to cloud computing system 106. In an operation 702, the user information is received from user computing device 102. In an operation 704, the received user information is sent to cloud computing system 106. In an operation 706, the one or more recommendation system applications 210 are sent to the user's computing device(s) identified in the received user information.

If a request is not received in an operation 708, processing continues at operation 708 to continuously monitor for a user request. If a request is received in operation 708, processing continues at operation 710. In operation 710, the received request is sent to cloud computing system 106. In an operation 712, a recommendation is received from cloud computing system 106. In an operation 714, the received recommendation is sent to user computing device 102.

The system continues to function on an ongoing basis, noting when user computing device 102 is on so that the user can be contacted. In the absence of user computing device 102 being on, lifestyle recommendation system 100 may send recommendations in emails. The user may instruct lifestyle recommendation system 100 to stop generating recommendations at any time, to cache the recommendations, or to modify the user's settings in any way, including unsubscribing from lifestyle recommendation system 100. Lifestyle recommendation system 100 can also print traditional mail or courier reminders as a service feature, if selected by the user. Thus, the user may receive real-time recommendations to one or more of the user's computing devices using various communication methods. Some recommendations may be directed to specific devices based on parameters set by the user as part of the user device information. For example, without an explicit user setting to the contrary, lifestyle recommendation system 100 may send vacation recommendations to the user's desktop or laptop computing device because that type of information is typically digested by the user in this setting versus a call or text message to a mobile device. Also, this kind of information is usually not time sensitive.

The recommendation logic systems are persistently subject to evolve and be updated based on data available to lifestyle recommendation system 100. The programming changes can be automated based upon conditions that exist and are computed by cloud computing system 106. For example, if salsa lessons were not popular in 2007, but become wildly popular in 2008 with married couples over 40 who reside in southern Georgia, lifestyle recommendation system 100 may update leisure activity recommendation data parameters for that demographic using news information from published trends and hot lists. Updated versions of the entire database logic can be exchanged between cloud computing system 106 and middleware system 104 for backup, archival, or auxiliary use.

Lifestyle recommendation system 100 may create an affinity program for frequent users. Lifestyle recommendation system 100 may charge users for use and/or may charge advertisers for access to lifestyle recommendation system 100 or integrate a hybrid economic model for use.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device comprising:
    a communication interface configured to receive first information from a second device;
    a processor; and
    a computer-readable medium including computer-readable instructions that, upon execution by the processor, cause the device to
        receive the first information wherein the first information includes user provided information and user account information, wherein the user provided information includes user preference information and a user account authorization, and wherein the user provided information includes a date corresponding to an event of significance to a user of the second device;
        request user account information from a third device based on the user account authorization;
        receive the requested user account information from the third device;
        store the received user provided information and the received user account information at a fourth device accessible by the device;
        receive a request for a recommendation from the second device;
        scan debit card or credit card information of the user of the second device;
        identify, based at least in part on the scan of the debit card or credit card information and at least in part on the date included in the user provided information, an omission from the debit card or credit card information related to the date;
        determine the recommendation based on the stored user provided information, the stored user account information, and the identified omission; and
        send the determined recommendation to the second device.

2. The device of claim 1, wherein the computer-readable instructions further cause the device to monitor general information services provided over a network to identify general information based on the user provided information.

3. The device of claim 2, wherein determination of the recommendation is further based on the identified general information.

4. A non-transitory computer-readable medium including computer-readable instructions that, upon execution by a processor, cause a device to:
    receive user provided information from a second device, wherein the user provided information includes user preference information and a user account authorization, and wherein the user provided information includes a date corresponding to an event of significance to a user of the second device;
    request user account information from a third device based on the user account authorization;
    receive the requested user account information from the third device;
    store the received user provided information and the received user account information at a fourth device accessible by the device;
    receive a request for a recommendation from the second device;
    scan debit card or credit card information of the user of the second device;
    identify, based at least in part on the scan of the debit card or credit card information and at least in part on the date included in the user provided information, an omission from the debit card or credit card information related to the date;
    determine the requested recommendation based on the stored user provided information, the stored user account information, and the identified omission; and
    send the determined recommendation to the second device.

5. The non-transitory computer-readable medium of claim 4, wherein determination of the recommendation comprises execution of a lifestyle recommendation application received from the second device using the stored user provided information and the stored user account information.

6. The non-transitory computer-readable medium of claim 4, wherein the user provided information further includes user device information related to a plurality of user devices.

7. The non-transitory computer-readable medium of claim 6, wherein the computer-readable instructions further cause the device to determine a user device of the plurality of user devices to which to send the recommendation based on the user device information.

8. The non-transitory computer-readable medium of claim 4, wherein determination of the recommendation is further based on information included in the received request.

9. The non-transitory computer-readable medium of claim 4, wherein the computer-readable instructions further cause the device to monitor general information services provided over a network to identify general information based on the user provided information.

10. The non-transitory computer-readable medium of claim 9, wherein determination of the recommendation is further based on the identified general information.

11. A method of providing a recommendation, the method comprising:
    receiving user provided information at a first device from a second device, wherein the user provided information includes user preference information and a user account authorization, and wherein the user provided information includes a date corresponding to an event of significance to a user of the second device;

requesting user account information from a third device based on the user account authorization;

receiving the requested user account information from the third device at the first device;

storing the received user provided information and the received user account information at a device accessible by the first device;

receiving a request for a recommendation from the second device;

scanning debit card or credit card information of the user of the second device;

identifying, based at least in part on the scan of the debit card or credit card information and at least in part on the date included in the user provided information, an omission from the debit card or credit card information related to the date;

determining the requested recommendation at the first device based on the stored user provided information, the stored user account information, and the identified omission; and sending the determined recommendation from the first device to the second device.

12. The method of claim 11, further comprising receiving a lifestyle recommendation application at the first device from the second device.

13. The method of claim 12, wherein determining the recommendation comprises executing the received lifestyle recommendation application at the first device using the stored user provided information and the stored user account information.

14. The method of claim 11, wherein the user provided information further includes user device information related to a plurality of user devices.

15. The method of claim 14, further comprising determining a user device of the plurality of user devices to which to send the recommendation based on the user device information.

16. The method of claim 11, wherein determining the recommendation is further based on information included in the received request.

17. The method of claim 16, wherein the information includes a location of a user device originating the request.

18. The method of claim 16, wherein the information includes an indication of an issue at a user device originating the request.

19. The method of claim 11, further comprising monitoring, from the first device, general information services provided over a network to identify general information based on the user provided information.

20. The method of claim 19, wherein determining the recommendation is further based on the identified general information.

* * * * *

UNITED STATES PATENT AND TRADEMARK OFFICE
CERTIFICATE OF CORRECTION

| | | |
|---|---|---|
| PATENT NO. | : 8,655,820 B2 | Page 1 of 1 |
| APPLICATION NO. | : 12/200043 | |
| DATED | : February 18, 2014 | |
| INVENTOR(S) | : Fein et al. | |

It is certified that error appears in the above-identified patent and that said Letters Patent is hereby corrected as shown below:

In the Specification

In Column 3, Line 10, delete "Input interface 104" and insert -- Input interface 200 --, therefor.

In Column 6, Line 6, delete "(positioning system (GPS)" and insert -- global positioning system (GPS) --, therefor.

In Column 9, Line 41, delete "and or" and insert -- and/or --, therefor.

Signed and Sealed this
First Day of July, 2014

Michelle K. Lee
*Deputy Director of the United States Patent and Trademark Office*